US011865836B2

(12) United States Patent
Murakami et al.

(10) Patent No.: US 11,865,836 B2
(45) Date of Patent: Jan. 9, 2024

(54) LIQUID EJECTING HEAD AND LIQUID EJECTING APPARATUS

(71) Applicant: Seiko Epson Corporation, Tokyo (JP)

(72) Inventors: Kentaro Murakami, Matsumoto (JP); Hiroaki Okui, Azumino (JP)

(73) Assignee: SEIKO EPSON CORPORATION

( * ) Notice: Subject to any disclaimer, the term of this patent is extended or adjusted under 35 U.S.C. 154(b) by 59 days.

(21) Appl. No.: 17/582,304

(22) Filed: Jan. 24, 2022

(65) Prior Publication Data

US 2022/0234350 A1 Jul. 28, 2022

(30) Foreign Application Priority Data

Jan. 25, 2021 (JP) ................................ 2021-009363

(51) Int. Cl.
*B41J 2/045* (2006.01)
*B41J 2/175* (2006.01)

(52) U.S. Cl.
CPC ....... *B41J 2/04563* (2013.01); *B41J 2/04581* (2013.01); *B41J 2/175* (2013.01)

(58) Field of Classification Search
CPC .... B41J 2/04563; B41J 2/04581; B41J 2/175; B41J 2/14201; B41J 2202/12; B41J 2202/20; B41J 2/14; B41J 2/01
USPC ........................................................... 347/17
See application file for complete search history.

(56) References Cited

U.S. PATENT DOCUMENTS

2007/0040877 A1* 2/2007 Kachi .................. B41J 2/17566 347/85
2009/0002425 A1* 1/2009 Min ....................... B41J 2/0451 347/17
2019/0011306 A1* 1/2019 Cumbie ................ G01F 23/248
2020/0282724 A1 9/2020 Okubo et al.

FOREIGN PATENT DOCUMENTS

JP 2020-142379 A 9/2020

* cited by examiner

*Primary Examiner* — Matthew Luu
*Assistant Examiner* — Alexander D Shenderov
(74) *Attorney, Agent, or Firm* — Harness, Dickey & Pierce, P.L.C.

(57) ABSTRACT

A liquid ejecting head includes: a nozzle; a flow path member in which a flow path communicating with the nozzle is formed and which has an inner wall surface defining the flow path and an outer wall surface that faces away from the flow path with respect to the inner wall surface; and a temperature sensor disposed on a part of the outer wall surface and configured to detect a temperature of the liquid in the flow path. The flow path includes a narrowed region having a narrow width in a second direction orthogonal to a first direction in a direction in which the flow path extends, and the temperature sensor is disposed on a portion of the outer wall surface that forms the narrowed region.

17 Claims, 11 Drawing Sheets

LIQUID EJECTING HEAD AND LIQUID EJECTING APPARATUS

The present application is based on, and claims priority from JP Application Serial Number 2021-009363, filed on Jan. 25, 2021, the disclosure of which is hereby incorporated by reference herein in its entirety.

BACKGROUND

1. Technical Field

The present disclosure relates to a liquid ejecting head and a liquid ejecting apparatus.

2. Related Art

A flow path through which a liquid flows is formed inside a liquid ejecting head that ejects a liquid such as an ink. The liquid ejecting head includes a temperature sensor that detects a temperature of the liquid in the flow path. In JP-A-2020-142379, a substrate in which the flow path is defined is provided with an opening communicating with the flow path. A temperature detection element is disposed on a metal plate that seals this opening.

Since a flow velocity of the liquid decreases in a region in contact with an inner wall surface of the flow path, a temperature of the liquid in the vicinity of the inner wall surface tends to be lower than a temperature of the liquid flowing in the center of the flow path away from the inner wall surface. For this reason, when the temperature of the liquid in the flow path is detected from an outer wall surface on a side opposite to the inner wall surface, there has been a risk of decreased accuracy of temperature detection of the liquid.

SUMMARY

According to an aspect of the present disclosure, a liquid ejecting head includes: a nozzle for ejecting a liquid; a flow path member in which a flow path communicating with the nozzle is formed and which has an inner wall surface defining the flow path and an outer wall surface on a side opposite to the flow path with respect to the inner wall surfaces; and a temperature sensor disposed on a part of the outer wall surface and detecting a temperature of the liquid in the flow path. The flow path includes a narrowed region having a narrow width in a second direction orthogonal to a first direction in a direction in which the flow path extends. The temperature sensor is disposed on a portion of the outer wall surface that forms the narrowed region.

According to another aspect of the present disclosure, a liquid ejecting apparatus includes: the liquid ejecting head as described above; and a liquid storage portion storing the liquid supplied to the liquid ejecting head.

DESCRIPTION OF EXEMPLARY EMBODIMENTS

Hereinafter, a mode for carrying out the present disclosure will be described with reference to the drawings. However, dimensions and scales of each portion in each drawing are appropriately different from actual dimensions and scales. In addition, since embodiments to be described below are suitable specific examples of the present disclosure, various technically preferable limitations are added, but the scope of the present disclosure is not limited to these forms unless it is stated in the following description that the present disclosure is particularly limited.

In the following description, three directions that intersect each other may be described as an X-axis direction, a Y-axis direction, and a Z-axis direction. The X-axis direction includes an X1 direction and an X2 direction, which are directions opposite to each other. The X-axis direction is an example of a third direction. The Y-axis direction includes a Y1 direction and a Y2 direction, which are directions opposite to each other. The Y-axis direction is an example of a first direction. The Z-axis direction includes a Z1 direction and a Z2 direction, which are directions opposite to each other. The Z1 direction is a downward direction, and the Z2 direction is an upward direction. The Z1 direction is the direction of gravity. The Z-axis direction is an example of a second direction. In addition, in the present specification, "upper" and "lower" are used. "Upper" and "lower" correspond respectively to "upper" and "lower" in a normal use state of a liquid ejecting apparatus 1.

The Z-axis direction is a direction in a vertical direction. The X-axis, the Y-axis, and the Z-axis directions are typically orthogonal to each other, but are not limited thereto. The Z-axis direction is not limited to the vertical direction.

Figure 1:
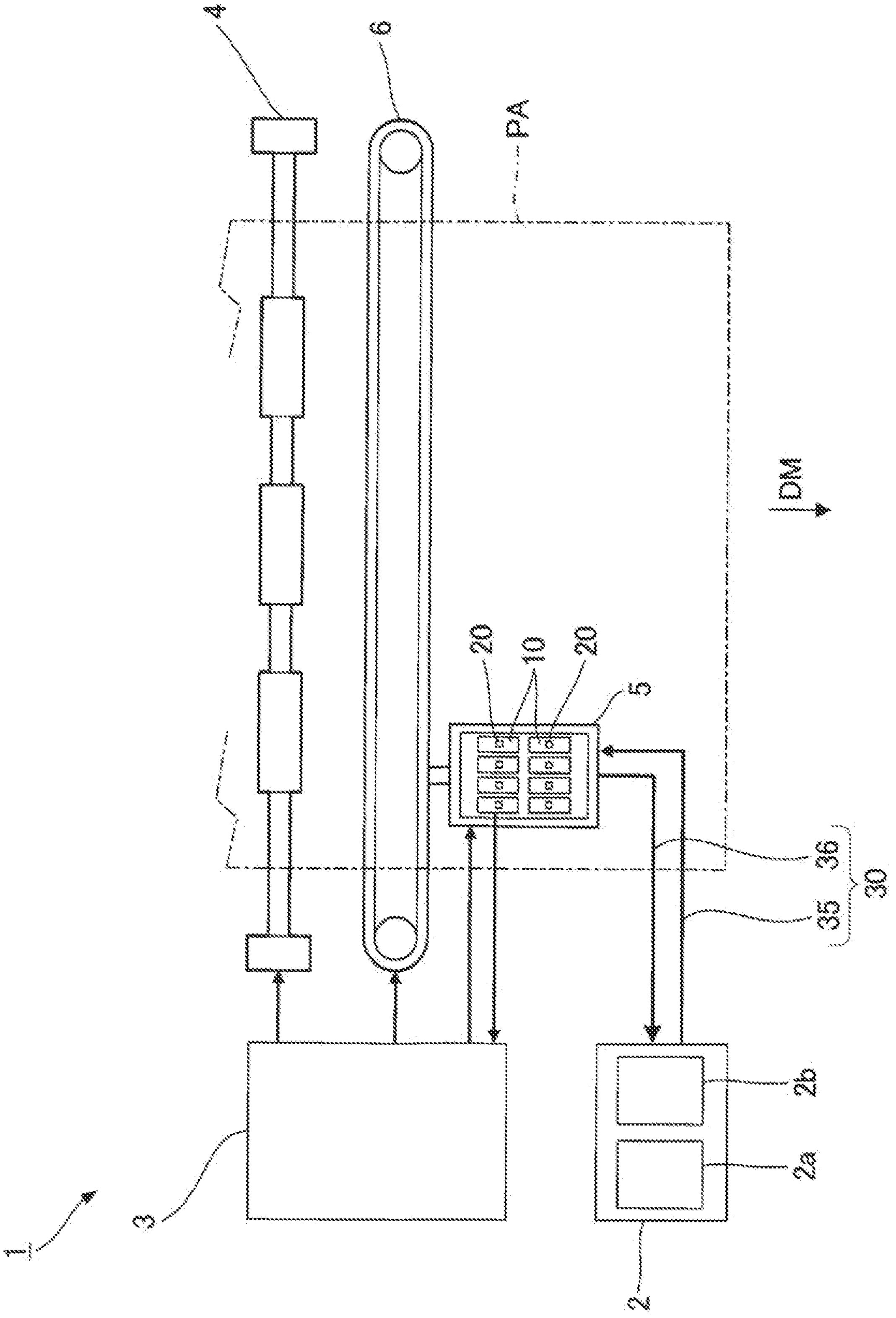
FIG. 1 is a schematic view illustrating a configuration of a liquid ejecting apparatus according to a first embodiment.

FIG. 1 is a schematic view illustrating a configuration of the liquid ejecting apparatus 1 according to a first embodiment. The liquid ejecting apparatus 1 is an ink jet printing apparatus that ejects an ink, which is an example of a "liquid", as droplets onto a medium PA. The liquid ejecting apparatus 1 is a serial type printing apparatus. The liquid ejecting apparatus 1 includes a plurality of liquid ejecting heads 10. The liquid ejecting head 10 ejects the ink toward the medium PA while moving in a width direction of the medium PA. The medium PA is typically printing paper. Note that the medium PA is not limited to printing paper, and may be a printing target of any material, such as a resin film or cloth.

As illustrated in FIG. 1, the liquid ejecting apparatus 1 includes a liquid container 2 that stores the ink. Examples of a specific aspect of the liquid container 2 include a cartridge that is attachable to and detachable from the liquid ejecting apparatus 1, a bag-shaped ink pack formed of a flexible film, and an ink tank that can be replenished with the ink. Note that any appropriate type of the ink may be stored in the liquid container 2. The liquid container 2 is an example of a liquid storage portion.

The liquid container 2 includes a first liquid container 2*a* and a second liquid container 2*b*. A first ink is stored in the first liquid container 2*a*. A second ink of a type different from that of the first ink is stored in the second liquid container 2*b*. For example, the first ink and the second ink are inks of colors different from each other. Note that the first ink and the second ink may be the same type of ink.

The liquid ejecting apparatus 1 includes a control unit 3, a medium transport mechanism 4, a carriage 5, and a carriage transport mechanism 6. The control unit 3 controls an operation of each element of the liquid ejecting apparatus 1. The control unit 3 includes, for example, a processing circuit, such as a central processing unit (CPU) or a field programmable gate array (FPGA), and a storage circuit, such as a semiconductor memory. Various programs and various data are stored in the storage circuit. The processing circuit realizes various forms of control by executing the program and appropriately using the data.

The medium transport mechanism 4 is controlled by the control unit 3 to transport the medium PA in a transport direction DM. The medium transport mechanism 4 includes a transport roller that transports the medium PA and a motor that rotates the transport roller. Note that the medium transport mechanism 4 is not limited to having a configuration using the transport roller, and may have, for example, a configuration using a drum or an endless belt that transports the medium PA in a state in which the medium PA clings onto an outer peripheral surface thereof by an electrostatic force or the like.

The plurality of liquid ejecting heads 10 are mounted on the carriage 5. The carriage transport mechanism 6 is controlled by the control unit 3 to reciprocate the carriage 5 in the width direction of the medium PA. The carriage transport mechanism 6 may include, for example, an endless belt laid over a plurality of rollers spaced apart from each other in the width direction of the medium PA. Note that the liquid container 2 may be configured to be mounted on the carriage 5 and be transported together with the plurality of liquid ejecting heads 10.

Figure 2:
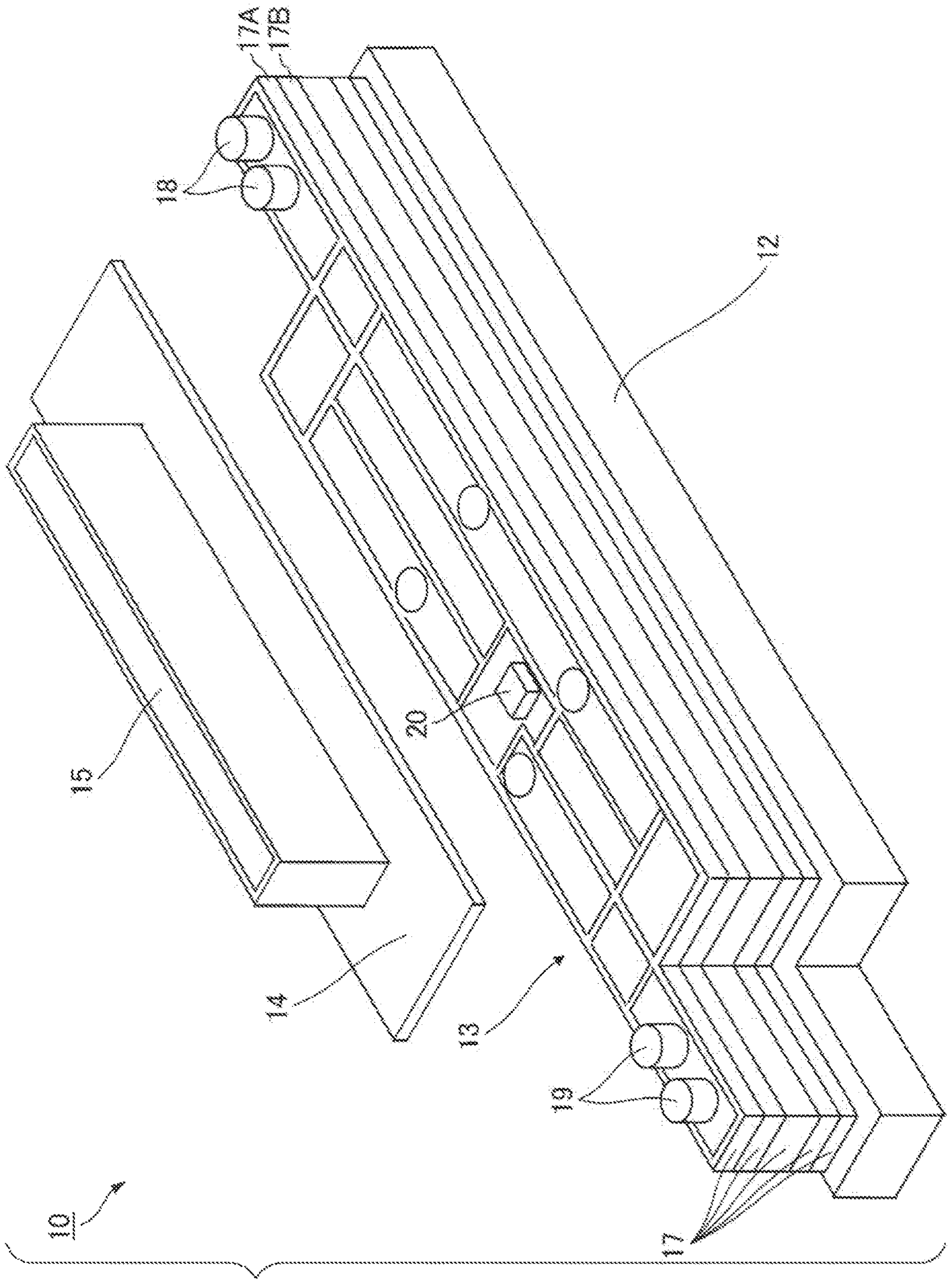
FIG. 2 is an exploded perspective view illustrating a liquid ejecting head.
Figure 3:
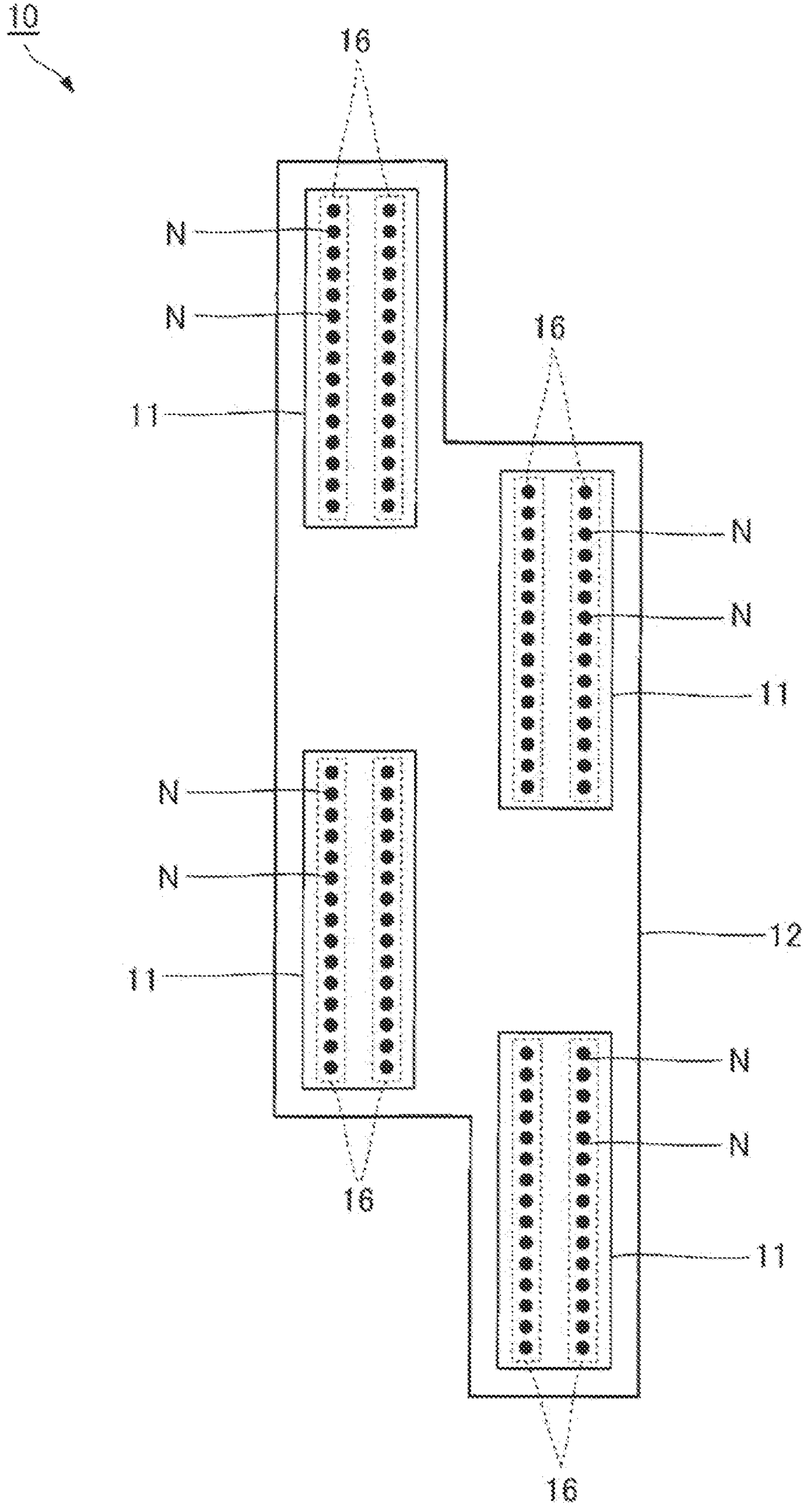
FIG. 3 is a bottom view of the liquid ejecting head.

FIG. 2 is an exploded perspective view illustrating the liquid ejecting head 10. FIG. 3 is a bottom view of the liquid ejecting head 10. The liquid ejecting head 10 includes a plurality of head chips 11 provided with nozzles N, a holder 12 holding the head chips 11, a flow path structure 13 in which a flow path of the ink is formed, a relay substrate 14 disposed on an upper portion of the flow path structure 13, and a connector 15 provided on the relay substrate 14.

As illustrated in FIG. 3, the plurality of head chips 11 are disposed at a bottom portion of the liquid ejecting head 10. The plurality of head chips 11 are held by the holder 12. The head chip 11 is provided with a plurality of nozzles N that eject a liquid. The nozzles N are arranged in a predetermined direction to constitute nozzle rows 16. A plurality of nozzle rows 16 are provided so as to correspond to types of inks.

As illustrated in FIG. 2, the flow path structure 13 is disposed on the holder 12. The flow path through which the ink flows is formed in the flow path structure 13. The flow path structure 13 includes a plurality of flow path substrates 17. The plurality of flow path substrates 17 are laminated in a plate thickness direction. For example, grooves and openings are formed in the flow path substrates 17. The flow paths are formed by these grooves and openings.

The liquid ejecting apparatus 1 employs an ink circulation method that circulates the ink. The flow path structure 13 is provided with ink supply ports 18 for introducing the ink into the flow path structure 13 and ink discharge ports 19 for discharging the ink from the flow path structure 13.

In addition, a temperature sensor 20 is disposed on the upper portion of the flow path structure 13. Details will be described later.

The relay substrate 14 covers the upper portion of the flow path structure 13. The relay substrate 14 is provided with a plurality of electrical wiring lines. The head chips 11 and the temperature sensor 20 are electrically coupled to the electrical wiring lines provided on the relay substrate 14.

The connector 15 projects upward from the relay substrate 14. The connector 15 is electrically coupled to an external electrical component of the liquid ejecting head 10. The head chips 11 and the temperature sensor 20 are electrically coupled to the control unit 3 via the connector 15.

Figure 4:
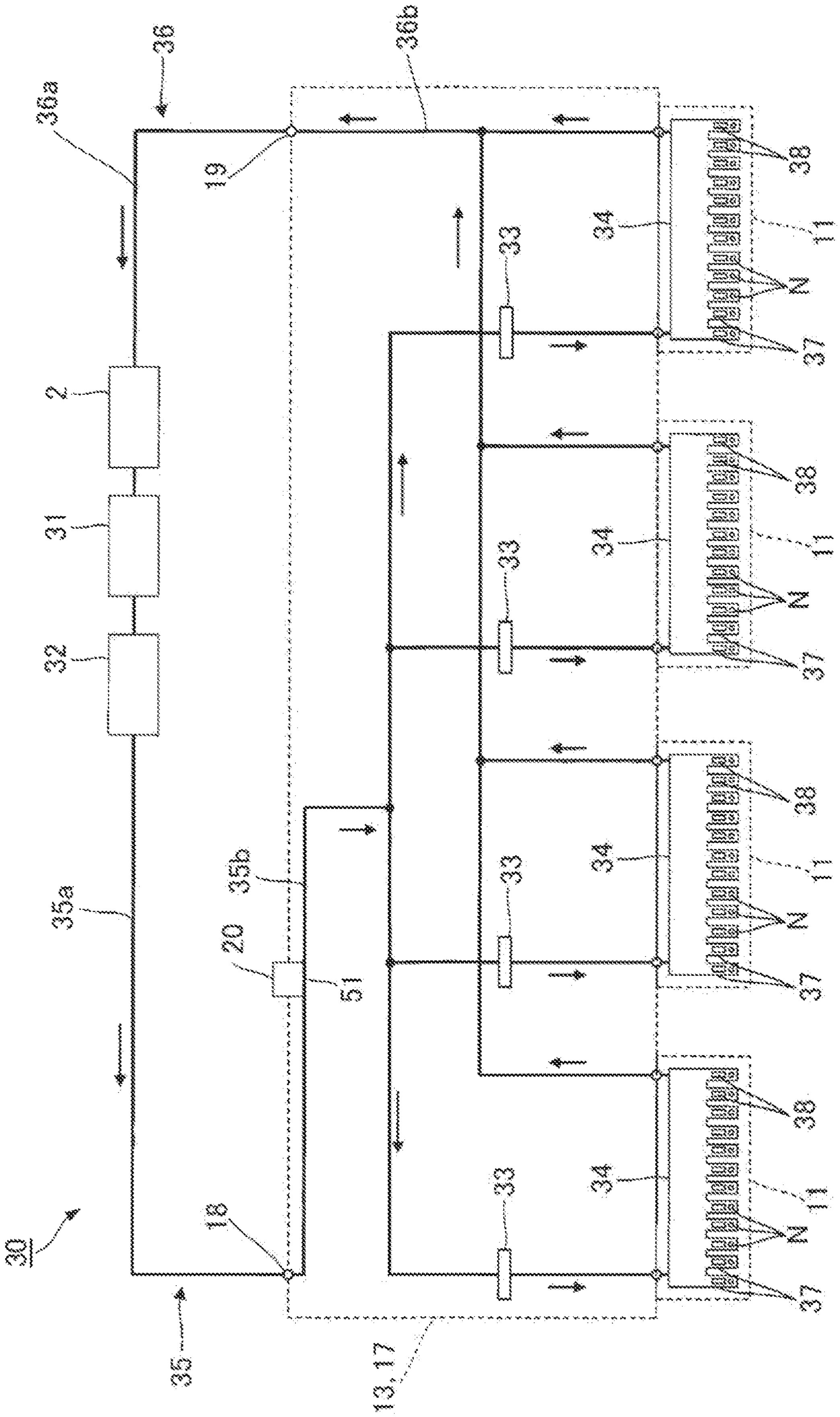
FIG. 4 is a schematic view illustrating a flow path of an ink of the liquid ejecting apparatus.

FIG. 4 is a schematic view illustrating a flow path 30 of an ink of the liquid ejecting apparatus 1. In FIG. 4, the flow path 30 through which one type of ink flows is illustrated. The flow path 30 of the ink is provided for each type of ink. The liquid container 2, a pump 31, a heater 32, filters 33, and common liquid chambers 34 are coupled to the flow path 30. The flow path 30 includes a supply flow path 35 and a collection flow path 36. The supply flow path 35 is a flow path for supplying the ink from the liquid container 2 to the common liquid chamber 34. The collection flow path 36 is a flow path for collecting the ink from the common liquid chamber 34 in the liquid container 2.

The pump 31 is coupled to the downstream of the liquid container 2 and transfers the ink stored in the liquid container 2. The heater 32 is coupled to the downstream of the pump 31 and heats the ink to a predetermined temperature. Note that the heater 32 may be configured to heat the ink stored in the liquid container 2. By adjusting a temperature of the ink, the ink viscosity can be adjusted. The liquid container 2, the pump 31, and the heater 32 are disposed outside the liquid ejecting head 10. The liquid container 2, the pump 31, and the heater 32 may be mounted on, for example, the carriage 5. The liquid container 2, the pump 31, and the heater 32 are coupled to the supply flow path 35.

The ink flows through the supply flow path 35, passes through the ink supply port 18, and is introduced into the flow path inside the flow path structure 13. The flow path inside the flow path structure 13 is branched into a plurality of portions and is coupled to the plurality of head chips 11. The head chip 11 is provided with the common liquid chamber 34. The ink introduced into the head chip 11 is stored in the common liquid chamber 34. A part of the ink stored in the common liquid chamber 34 is ejected from the nozzles N.

The filter 33 is provided upstream of the common liquid chamber 34 in the flow path inside the flow path structure 13. The ink that has passed through the filter 33 is supplied to the common liquid chamber 34. The filter 33 removes foreign matter and air bubbles mixed in the ink.

The ink that is not ejected from the nozzles N in the ink stored in the common liquid chamber 34 is collected in the liquid container 2. The ink discharged from the common liquid chamber 34 flows through the flow path inside the flow path structure 13, passes through the ink discharge port 19, and is discharged outside the flow path structure 13. The ink discharged from the ink discharge port 19 flows through the collection flow path 36 and is collected in the liquid container 2. As described above, the ink is circulated.

The head chip 11 includes the common liquid chamber 34, pressure chambers 37, piezoelectric actuators 38, and the nozzles N. A plurality of pressure chambers 37 are coupled to the common liquid chamber 34. The piezoelectric actuator 38 and the nozzle N are provided for each of the plurality of pressure chambers 37. The pressure chamber 37 enables the common liquid chamber 34 and the nozzle N to communicate with each other. The ink in the common liquid chamber 34 flows into the pressure chamber 37.

The piezoelectric actuator 38 is electrically coupled to the control unit 3. The piezoelectric actuator 38 is controlled and driven by the control unit 3. The piezoelectric actuator 38 deforms wall surfaces of the pressure chamber 37 to change the volume of the pressure chamber 37 interior. As a result, the piezoelectric actuator 38 ejects the ink in the pressure chamber 37 from the nozzle N. Note that the liquid ejecting head 10 may be configured to include other driving elements, such as heat generating elements, instead of the piezoelectric actuators 38.

The temperature sensor 20 detects a temperature of the ink flowing through a flow path **35*b* inside the flow path structure 13. The temperature sensor 20 detects the ink in the flow path 35*b* downstream of the ink supply port 18. Note that the temperature sensor 20 may detect a temperature of the ink in the flow path 35*b* downstream of the filter 33. The temperature sensor 20 may detect a temperature of the ink in a flow path 35*a* upstream of the ink supply port 18. In addition, the temperature sensor 20 may detect a temperature of the ink in flow paths 36*a* and 36*b* downstream of the common liquid chamber 34**.

Figure 5:
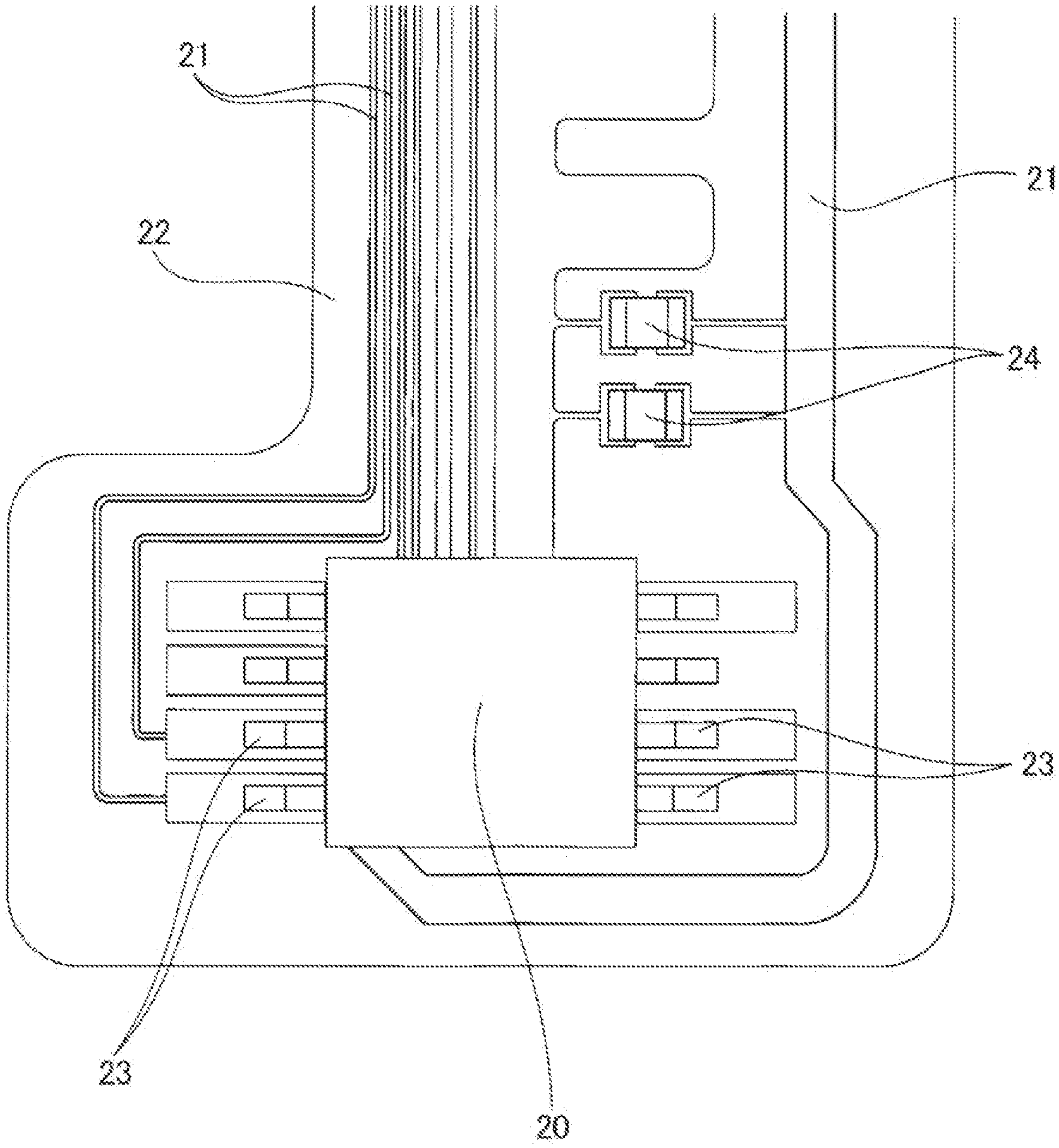
FIG. 5 is a plan view illustrating a temperature sensor and wiring lines.

The temperature sensor 20 is disposed on the upper portion of the flow path structure 13 as illustrated in FIG. 2. The temperature sensor 20 is disposed on the flow path substrate 17 disposed on the uppermost side. FIG. 5 is a plan view illustrating the temperature sensor 20 and wiring lines 21. The temperature sensor 20 is electrically coupled to the wiring lines 21 formed on a flexible substrate 22. In addition, an electronic component 24, such as a capacitor is electrically coupled to the wiring lines 21. The flexible substrate 22 is coupled to the connector 15. The temperature sensor 20 is electrically coupled to the control unit 3. The temperature sensor 20 is electrically coupled to the wiring lines 21 via coupling terminals 23 provided on the flexible substrate 22.

Figure 6:
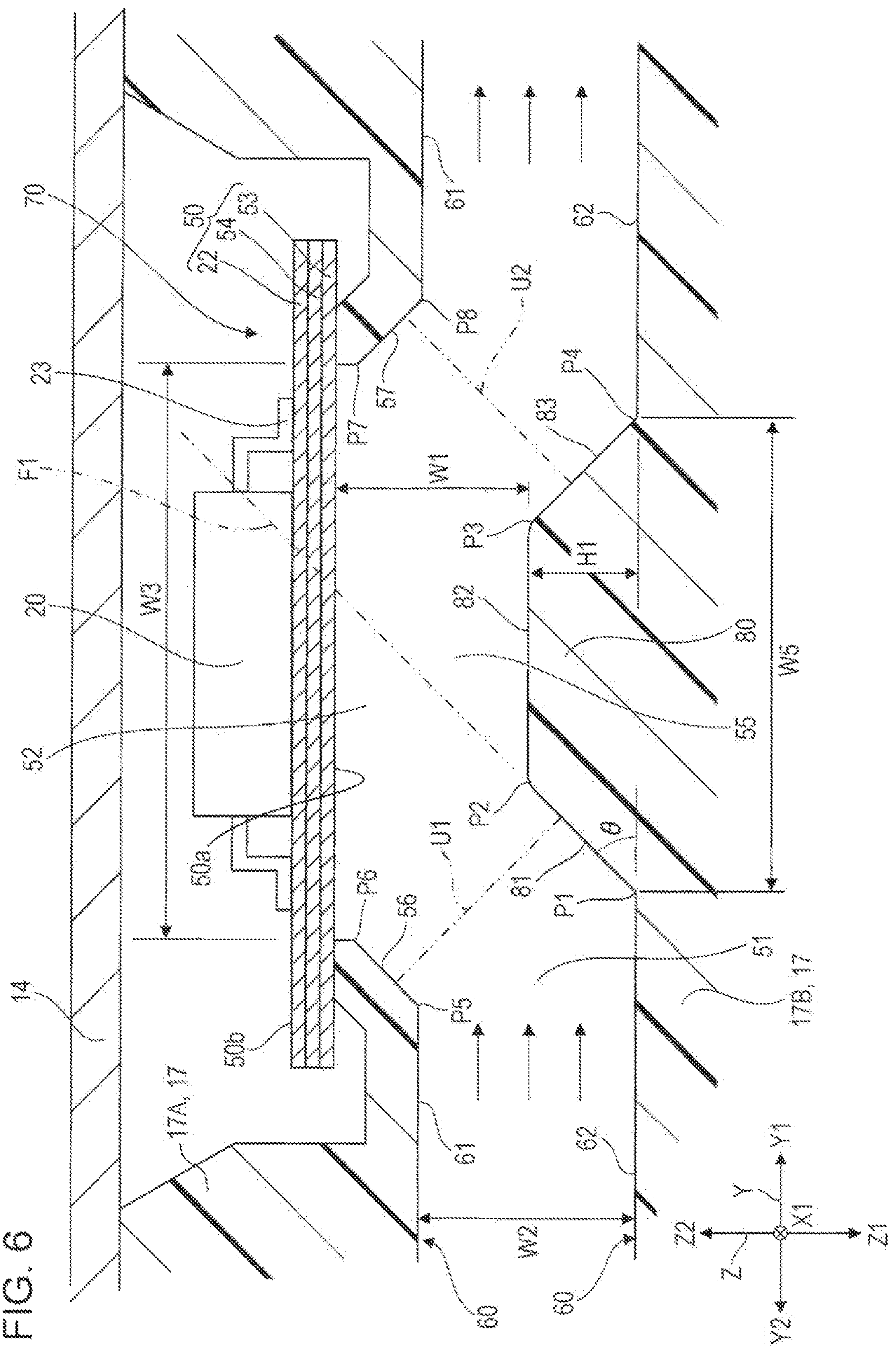
FIG. 6 is a sectional view illustrating the temperature sensor and a protrusion portion and is a view illustrating a cross section in a flow direction of the ink.
Figure 7:
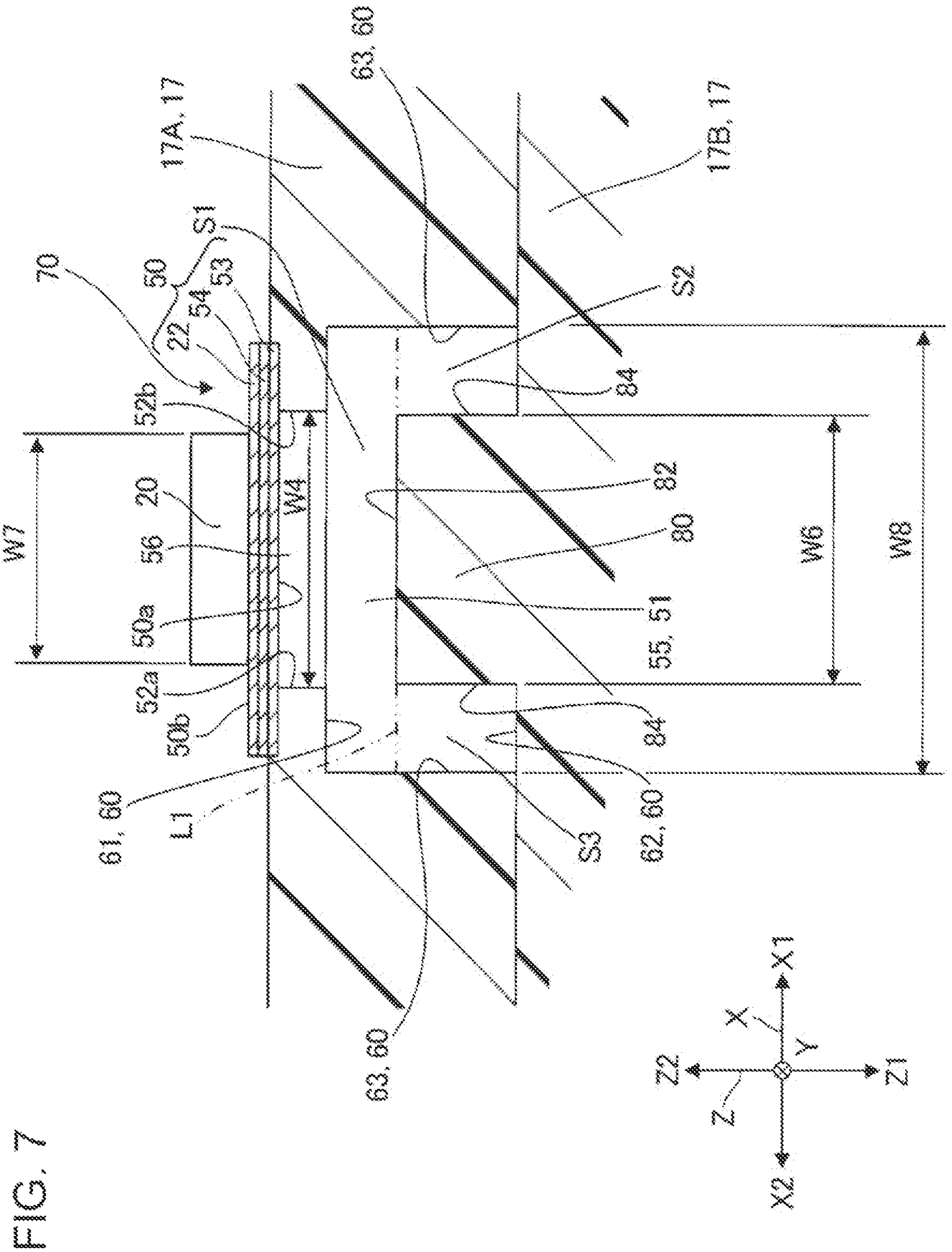
FIG. 7 is a sectional view illustrating the temperature sensor and the protrusion portion and is a view illustrating a cross section orthogonal to the flow direction of the ink.
Figure 8:
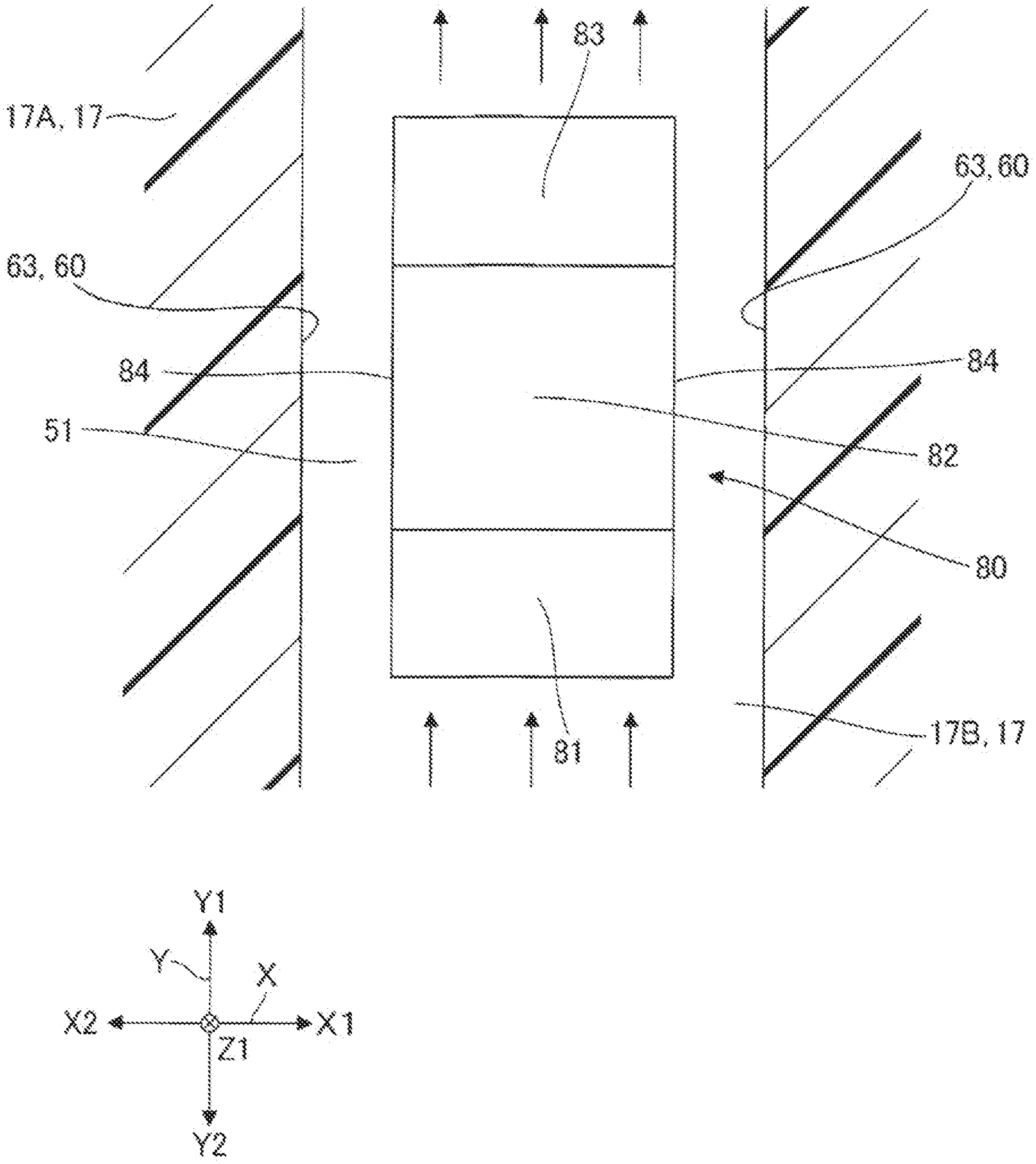
FIG. 8 is a sectional view illustrating the protrusion portion when viewed in a Z-axis direction.

FIG. 6 is a sectional view illustrating the temperature sensor 20 and a protrusion portion 80 and is a view illustrating a cross section in a flow direction of the ink. FIG. 7 is a sectional view illustrating the temperature sensor 20 and the protrusion portion 80 and is a view illustrating a cross section orthogonal to the flow direction of the ink. FIG. 8 is a sectional view illustrating the protrusion portion 80 when viewed in the Z-axis direction. In FIGS. 6 to 8, arrows indicating the flow direction of the ink are illustrated. In FIGS. 6 to 8, the ink flows substantially in the Y1 direction.

As illustrated in FIGS. 6 and 7, the temperature sensor 20 detects a temperature of the ink in a flow path 51 of the flow path structure 13. The flow path structure 13 includes the plurality of flow path substrates 17 as described above. The plurality of flow path substrates 17 include flow path substrates 17A and 17B. The flow path substrate 17A is laminated on the flow path substrate 17B. A thickness direction of the flow path substrates 17A and 17B corresponds to the Z-axis direction. The flow path substrate 17A is disposed in the Z2 direction of the flow path substrate 17B. The flow path substrate 17A is an example of a first flow path substrate, and the flow path substrate 17B is an example of a second flow path substrate. The flow path 51 is, for example, a part of the supply flow path **35*b***.

The flow path structure 13 has inner surfaces 60 that define the flow path 51 and an outer surface 70 on a side opposite to the flow path 51 with respect to the inner surfaces 60. The inner surface 60 is an example of an inner wall surface, and the outer surface 70 is an example of an outer wall surface. The outer surface 70 is a surface on an outer side of the flow path structure 13 that does not constitute the flow path 51.

The inner surfaces 60 include inner surfaces 61 and 62. The inner surfaces 61 and 62 are spaced apart from each other in the Z-axis direction. In the Z-axis direction, a region between the inner surfaces 61 and 62 constitutes the flow path 51. The inner surfaces 60 include inner surfaces 63 and 63, as illustrated in FIGS. 7 and 8. The inner surfaces 63 and 63 are spaced apart from each other in the X-axis direction. In the X-axis direction, a region between the inner surfaces 63 and 63 constitutes the flow path 51. The inner surfaces 61 and 63 are formed on the flow path substrate 17A. The inner surface 62 is formed on the flow path substrate 17B. The flow path substrate 17 is made of, for example, a resin.

As illustrated in FIG. 6, an opening 52 passing through the flow path substrate 17A in the Z-axis direction is formed in the flow path substrate 17A. The opening 52 communicates with the flow path 51. The opening 52 is formed upward from the flow path 51. The flow path structure 13 includes a sealing portion 50 that covers the opening 52. The sealing portion 50 includes the above-mentioned flexible substrate 22 and sealing plates 53 and 54. A thickness direction of the flexible substrate 22 and the sealing plates 53 and 54 corresponds to the Z-axis direction.

The sealing plate 53 is disposed at a position closest to the opening 52 in the Z-axis direction. The sealing plate 53 covers the opening 52 from above. The sealing plate 54 is disposed in the Z2 direction of the sealing plate 53. The flexible substrate 22 is disposed in the Z2 direction of the sealing plate 54. The sealing plate 54 functions as a reinforcing plate reinforcing the flexible substrate 22.

A metal or a ceramic can be used as a material for the sealing plates 53 and 54. It is preferable to use a metal or a ceramic having high thermal conductivity as the material for the sealing plates 53 and 54. As the metal, for example, stainless steel or aluminum can be used. The number of sealing plates 53 and 54 included in the sealing portion 50 is not limited to two, and may be one or may be three or more. The sealing portion 50 is not limited to including the flexible substrate 22. The flexible substrate 22 and the sealing plates 53 and 54 may be adhered to each other by, for example, an adhesive having high thermal conductivity.

The sealing portion 50 includes an inner surface **50*a* and an outer surface 50*b* spaced apart from each other in the Z-axis direction. The inner surface 50*a* is a surface, in the Z1 direction, of the sealing plate 53 positioned on the most Z1 direction side in the sealing portion 50. The inner surface 50*a* is included in the inner surface 60 that defines the flow path 51. The outer surface 50*b* is a surface, in the Z2 direction, of the flexible substrate 22 positioned on the most Z2 direction side in the sealing portion 50. The outer surface 50*b* is included in the outer surface 70. The temperature sensor 20 is installed on the outer surface 50*b* of the sealing portion 50. The temperature sensor 20 may be adhered to the sealing portion 50 by, for example, an adhesive having high thermal conductivity. When the sealing portion 50 does not include the flexible substrate 22, the temperature sensor 20 may be installed on the sealing plate 54. In this case, the temperature sensor 20 is electrically coupled to the flexible substrate 22 existing in the vicinity of the temperature sensor 20**.

The flow path structure 13 includes the protrusion portion 80 protruding into the flow path 51 from the inner surface 62 toward the temperature sensor 20. The protrusion portion 80 is positioned in the Z1 direction of the opening 52. The protrusion portion 80 includes a slope 81, a top surface 82, and a slope 83. The slope 81 is an example of a first slope. The slope 81 includes a surface disposed upstream of the temperature sensor 20 in the Y-axis direction. Most of the slope 81 is disposed upstream of the temperature sensor 20. A part of the slope 81 may be disposed so as to overlap the temperature sensor 20 when viewed in the Z-axis direction.

The slope 81 is inclined with respect to the inner surface 62 when viewed in the X-axis direction. An inclination angle θ of the slope 81 with respect to the inner surface 62 is, for example, 45°. The inclination angle θ of the slope 81 may be, for example, 50° or less. The inner surface 62 is an example of a reference plane, and is a surface along the X-axis direction and the Y-axis direction.

A position P1 of the slope 81 is the most upstream position of the slope 81. A position P2 of the slope 81 is the most downstream position of the slope 81. The position P2 is located at a position closer to the temperature sensor 20 than the position P1 is, in the Z-axis direction. The position P1 is an example of a first position of the first slope. The position P2 is an example of a second position of the first slope. The slope 81 is inclined so that the position P2 on the downstream is closer to the temperature sensor 20 in the Z-axis direction than the position P1 on the upstream is.

The top surface 82 is a surface in the Y-axis direction when viewed in the X-axis direction. The top surface 82 is disposed downstream of the slope 81. In the protrusion portion 80, the top surface 82 is a surface closest to the temperature sensor 20. The top surface 82 may be linearly formed or may be curved when viewed in the X-axis direction. The top surface 82 is disposed so as to overlap the temperature sensor 20 when viewed in the Z-axis direction.

The slope 83 is disposed downstream of the top surface 82. The slope 83 includes a surface disposed downstream of the temperature sensor 20 in the Y-axis direction. Most of the slope 83 is disposed downstream of the temperature sensor 20. A part of the slope 83 may be disposed so as to overlap the temperature sensor 20 when viewed in the Z-axis direction. The slope 83 is inclined with respect to the inner surface 62 when viewed in the X-axis direction. An inclination angle of the slope 83 with respect to the inner surface 62 is, for example, 45°. The inclination angle of the slope 83 with respect to the inner surface 62 may be 50° or less. The slope 83 may have the same inclination angle as the slope 81 or may have an inclination angle different from that of the slope 81.

A position P3 of the slope 83 is the most upstream position of the slope 83. A position P4 of the slope 83 is the most downstream position of the slope 83. The position P3 is located at a position closer to the temperature sensor 20 than the position P4 is, in the Z-axis direction. The slope 83 is inclined so that the position P4 on the downstream is further from the temperature sensor 20 in the Z-axis direction than the position P3 on the upstream is.

The flow path 51 includes a narrowed region 55 having a narrow width in the Z-axis direction. The narrowed region 55 includes a region between the top surface 82 of the protrusion portion 80 and the inner surface 50*a* of the sealing portion 50 in the Z-axis direction. A width W1 of the narrowed region 55 is smaller than a width W2 of the flow path 51. The width W1 is a distance between the top surface 82 and the inner surface 50*a* in the Z-axis direction. The width W2 is a distance between the inner surface 61 and the inner surface 62 in the Z-axis direction.

The temperature sensor 20 is disposed on a portion forming the narrowed region 55. The portion forming the narrowed region 55 includes a portion of the outer surface 70 that overlaps the narrowed region 55 when viewed in the Z-axis direction intersecting the flow direction of the ink. The portion forming the narrowed region 55 includes a position of the outer surface 50*b* of the sealing portion 50 that overlaps with the top surface 82 when viewed in the Z-axis direction. The "flow direction of the ink" mentioned here is the Y-axis direction, and is a direction along the top surface 82 when viewed in the X-axis direction. In addition, the flow direction of the ink may be a direction orthogonal to a lamination direction of the flow path substrates 17. In addition, the "flow direction of the ink" may be a direction in which the flow path 51 which is a flow path detected by the temperature sensor 20 and includes the narrowed region 55 extends, when viewed in the Z-axis direction in a direction in which the temperature sensor 20 is laminated with respect to the outer surface 70.

A height H1 of the protrusion portion 80 corresponds to, for example, a length equal to 50% of the width W2 of the flow path 51. The height H1 of the protrusion portion 80 is a distance between the inner surface 62 and the top surface 82 in the Z-axis direction. The height H1 of the protrusion portion 80 may be 30% or more and less than 70% of the width W2 of the flow path 51. The height H1 of the protrusion portion 80 may be 45% or more and 55% or less of the width W2 of the flow path 51. In addition, the width W1 may be 50% or more and less than 95% of the width W2.

A virtual plane F1 extending along the slope 81 overlaps the temperature sensor 20 when viewed in the X-axis direction. An inclination angle of the virtual plane F1 with respect to the inner surface 62 is the same inclination angle θ as the slope 81.

The flow path substrate 17A includes a slope 56 disposed upstream of the temperature sensor 20 in the Y-axis direction and a slope 57 disposed downstream of the temperature sensor 20 in the Y-axis direction. The slope 56 is an example of a second slope. The slope 56 is spaced apart from the slope 81 in a normal direction U1 of the slope 81.

A position P5 of the slope 56 is the most upstream position of the slope 56. A position P6 of the slope 56 is the most downstream position of the slope 56. The position P6 is disposed at a position closer to the temperature sensor 20 than the position P5 is, in the Z-axis direction. The position P5 is an example of a first position of the second slope. The position P6 is an example of a second position of the second slope. The slope 56 is inclined so that the position P6 on the downstream is closer to the temperature sensor 20 in the Z-axis direction than the position P5 on the upstream is.

A position P7 of the slope 57 is the most upstream position of the slope 57. A position P8 of the slope 57 is the most downstream position of the slope 57. The position P7 is disposed at a position closer to the temperature sensor 20 than the position P8 is, in the Z-axis direction. The slope 57 is inclined so that the position P8 on the downstream is further from the temperature sensor 20 in the Z-axis direction than the position P7 on the upstream is.

The slope 56 is disposed in the Y2 direction of the opening 52, and the slope 57 is disposed in the Y1 direction of the opening 52. The opening 52 is long in the Y-axis direction. A length W3 of the opening 52 in the Y-axis direction is greater than a length W4 of the opening 52 in the X-axis direction. The phrase "long in the Y-axis direction" means that the length W3 in the Y-axis direction is longer than the length W4 in the X-axis direction. The length W3 is a length between the position P6 and the position P7 in the Y-axis direction. The length W4 is a length between an inner surface 52*a* and an inner surface 52*b* in the X-axis direction. The inner surface 52*a* and the inner surface 52*b* are surfaces that define the opening 52, are spaced apart from each other in the X-axis direction, and are extend in the Y-axis direction and the Z-axis direction.

The length W3 of the opening 52 in the Y-axis direction is greater than a length W5 of the protrusion portion 80 in the Y-axis direction. The length W5 is a length between the position P1 and the position P4 in the Y-axis direction.

As illustrated in FIGS. 7 and 8, the flow path 51 is also formed on both sides of the protrusion portion 80 in the X-axis direction. The protrusion portion 80 has side surfaces 84 and 84 that are spaced apart in the X-axis direction. The side surfaces 84 face the inner surfaces 63 in the X-axis direction. Regions between the inner surfaces 63 and the side surfaces 84 are also included in the flow path 51.

As illustrated in FIG. 7, in a cross section orthogonal to the Y-axis direction, a cross-sectional area S1 of the flow path close to the temperature sensor 20 from the top surface 82 is greater than the sum of cross-sectional areas S2 and S3 of the flow path 51 far from the temperature sensor 20 from the top surface 82. In FIG. 7, a cross section, orthogonal to a Y axis, of the flow path 51 cut so as to pass through the temperature sensor 20 and the top surface 82 is illustrated. In FIG. 7, a virtual line L1 extending in the X-axis direction along the top surface 82 is illustrated by a two-dot chain line. The cross-sectional area S1 is a region located in the Z2 direction with respect to the virtual line L1 in a cross section of the flow path 51. The cross-sectional area S2 is a region positioned in the Z1 direction with respect to the virtual line L1 in the cross section of the flow path 51, and is a region positioned in the X1 direction of the protrusion portion 80. The cross-sectional area S3 is a region positioned in the Z1 direction with respect to the virtual line L1 in the cross section of the flow path 51, and is a region positioned in the X2 direction of the protrusion portion 80. The cross-sectional area S1 is greater than the sum of the cross-sectional areas S2 and S3.

In addition, a width W6 of the protrusion portion 80 in the X-axis direction is greater than a width W7 of the temperature sensor 20 in the X-axis direction. The width W6 of the protrusion portion 80 in the X-axis direction is smaller than a width W8 of the flow path 51 in the X-axis direction. The width W8 of the flow path 51 in the X-axis direction is a length between the inner surfaces 63 and 63 in the X-axis direction. The width W6 of the protrusion portion 80 formed on the flow path substrate 17B is narrower than a distance between the inner surfaces 63 and 63 formed on the flow path substrate 17A. As a result, a defect that the protrusion portion 80 cannot be disposed between the inner surfaces 63 and 63 when the flow path substrates 17A and 17B are laminated is prevented.

In such a liquid ejecting apparatus 1, the temperature of the ink flowing in the flow path 51 is detected by the temperature sensor 20 disposed on the outer surface 50*b* of the sealing portion 50. Information on the temperature of the ink detected by the temperature sensor 20 is input to the control unit 3. The control unit 3 may calculate the ink viscosity based on the temperature of the ink flowing in the flow path 51. The control unit 3 can control the piezoelectric actuator 38 according to the ink viscosity to adjust an ejection amount of the ink, or control the heater 32 to adjust the temperature of the ink supplied to the liquid ejecting head 10.

According to the liquid ejecting apparatus 1, since the protrusion portion 80 protruding from the inner surface 62 toward the temperature sensor 20 in the Z2 direction is provided, a flow of the ink flowing in the flow path 51 can be brought to the temperature sensor 20 in the Z-axis direction. The temperature of the ink flowing inside the flow path 51 is higher in a portion close to the center than a portion far from the center, in the cross section orthogonal to the flow direction of the ink. In the liquid ejecting apparatus 1, since a flow near the center can be brought closer to the temperature sensor 20 in the cross section of the flow path 51, detection accuracy of the temperature of the ink by the temperature sensor 20 can be improved.

In the liquid ejecting apparatus 1, since the slope 81 is provided upstream of the protrusion portion 80, it is easy to bring the flow of the ink toward the temperature sensor 20 while suppressing an increase in pressure loss of the ink. In addition, in the liquid ejecting apparatus 1, since the slope 83 is provided downstream of the protrusion portion 80, the flow of the ink can be returned from the temperature sensor 20 toward the Z1 direction while suppressing an increase in pressure loss of the ink.

In the liquid ejecting apparatus 1, the opening 52 is formed in the Z2 direction of the protrusion portion 80, and the opening 52 is long in the Y-axis direction. It is easy to bring the flow of the ink toward the temperature sensor 20 when the length of the opening 52 in the Y-axis direction is great as compared to the case when the length the opening 52 in the Y-axis direction is small. When the length of the opening 52 in the Y-axis direction is small, the flow of the ink in the Y-axis direction at a position close to the temperature sensor 20 becomes short, such that it is difficult to bring the flow of the ink close to the temperature sensor 20. When the length W3 of the opening 52 in the Y-axis direction is great, the flow of the ink in contact with the inner surface 50*a* of the sealing portion 50 can be lengthened. As a result, the flow of the ink can be brought closer to the temperature sensor 20, such that detection accuracy of the temperature of the ink by the temperature sensor 20 can be improved.

In the liquid ejecting apparatus 1, when viewed in the X-axis direction, the virtual plane F1 extending along the slope 81 of the protrusion portion 80 overlaps the temperature sensor 20. Since such a slope 81 is provided, the ink flowing along the slope 81 is brought to a position close to the temperature sensor 20. For that reason, the detection accuracy of the temperature of the ink by the temperature sensor 20 can be improved.

In the liquid ejecting apparatus 1, the inclination angle θ of the slope 81 with respect to the inner surface 62 is 45°. As a result, the flow of the ink can be brought closer to the temperature sensor 20 while suppressing pressure loss upstream of the protrusion portion 80.

In the liquid ejecting apparatus 1, the slope 56 disposed upstream of the temperature sensor 20 in the Y-axis direction and spaced apart from the slope 81 in the normal direction U1 of the slope 81 is formed. As a result, the ink flows along the slope 56, and thus, it is easy to bring the ink to a position closer to the temperature sensor 20 while suppressing pressure loss upstream of the temperature sensor 20. For that reason, the detection accuracy of the temperature of the ink by the temperature sensor 20 can be improved.

In the liquid ejecting apparatus 1, the temperature sensor 20 is installed on the outer surface 50*b* of the sealing portion 50 that seals the opening 52. A total thickness of the sealing portion 50 including the flexible substrate 22 and the sealing plates 53 and 54 laminated in the Z-axis direction is smaller than that of the flow path substrate 17A. By installing the temperature sensor 20 on such a thin sealing portion 50, it is possible to allow the temperature sensor 20 to approach the ink in the flow path 51.

When the opening 52 is provided in the Z-axis direction intersecting the Y-axis direction in which the flow path 51 extends, there is a risk that stagnation will occur in the flow of the ink. When the stagnation occurs in the opening 52, there is a risk of the decreased accuracy of the temperature of the ink detected by the temperature sensor 20. However, in the liquid ejecting apparatus 1, since the protrusion portion 80 is provided in the Z1 direction of the opening 52, the flow of the ink can be brought to a position closer to the opening 52. Therefore, the flow of the ink in the opening 52 can be increased, such that the stagnation of the flow of the ink in the opening 52 can be suppressed. As a result, the detection accuracy of the temperature of the ink by the temperature sensor 20 can be improved.

In the liquid ejecting apparatus 1, since the flow path substrate 17 is made of the resin, a manufacturing cost of the flow path structure 13 can be reduced and a weight of the liquid ejecting head 10 can be reduced. When the flow path substrate 17 is made of the resin, a thickness of the flow path substrate 17 becomes great, but by providing the opening 52 in the flow path substrate 17 and sealing the opening 52 with the sealing portion 50 having a small thickness, thermal resistance from the flow path 51 to the temperature sensor 20 can be decreased. Further, by including the sealing plates 53 and 54 made of the metal or the ceramic in at least a part of the sealing portion 50, the thermal resistance from the flow path 51 to the temperature sensor 20 can be further decreased.

In the liquid ejecting apparatus 1, the length W3 of the opening 52 in the Y-axis direction is greater than the length W5 of the protrusion portion 80 in the Y-axis direction. As a result, it is easy to bring the ink into the opening 52 while suppressing an increase in resistance in the flow path 51 in the vicinity of the protrusion portion 80.

In the liquid ejecting apparatus 1, the protrusion portion 80 is formed on a side opposite to the opening 52 in the Z-axis direction. When the opening 52 is positioned at an upper portion, it is easy for air bubbles to stay, but since the protrusion portion 80 is formed below the opening 52, the flow of the ink flowing into the opening 52 is increased, such that the staying of the air bubbles in the opening 52 can be suppressed. Since the air bubbles flow due to the flow of the ink flowing into the opening 52, the staying of the air bubbles in the opening 52 is suppressed.

In the liquid ejecting apparatus 1, in the cross section orthogonal to the Y-axis direction, the cross-sectional area S1 of the flow path 51 close to the temperature sensor 20 from the top surface 82 is greater than the cross-sectional areas S2 and S3 of the flow path 51 far from the temperature sensor 20 from the top surface 82. As a result, resistance of the flow path closer to the temperature sensor 20 can be made smaller than resistance of the flow path further from the temperature sensor 20. For that reason, it is easy for the ink to flow to a side closer to the temperature sensor 20, such that a flow rate of the ink flowing near the temperature sensor 20 can be increased. As a result, it is possible to suppress the staying of the air bubbles in the opening 52 and improve the detection accuracy of the temperature of the ink by the temperature sensor 20.

Figure 9:
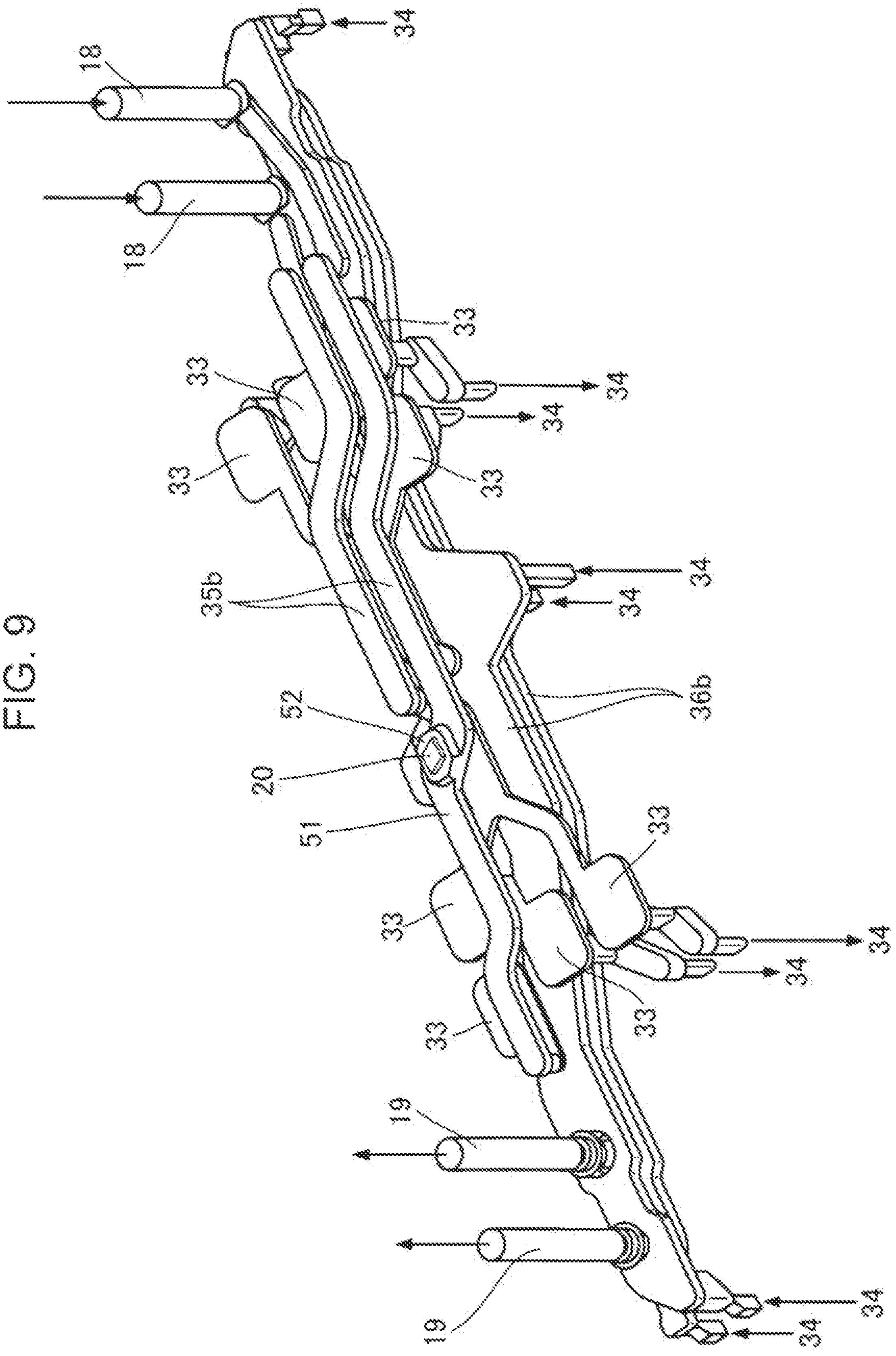
FIG. 9 is a perspective view illustrating an example of a flow path formed inside a flow path structure.

FIG. 9 is a perspective view illustrating an example of the flow path 51 formed inside the flow path structure 13. In FIG. 9, shapes of the flow paths 35*b*, 36*b*, and 51 formed inside the flow path structure 13 are illustrated. The flow path structure 13 includes the plurality of flow path substrates 17. In FIG. 9, the flow path structure 13 and the flow path substrates 17 are not illustrated. The flow paths 35*b*, 36*b*, and 51 are formed by grooves, through holes, faces in contact with these grooves and through holes, or the like, provided in the flow path substrates 17. The flow paths 35*b* are supply flow paths 35*b* in the flow path structure 13 and allow the ink supply ports 18 and the common liquid chambers 34 to communicate with each other. The flow paths 36*b* are collection flow paths 36*b* in the flow path structure 13, and allow the common liquid chambers 34 and the ink discharge ports 19 to communicate with each other. The flow path 51 is a flow path in the vicinity of the temperature sensor 20, and is included in, for example, the supply flow path 35*b*. The supply flow paths 35*b* are provided with the filters 33.

The temperature sensor 20 is disposed on the opening 52 that communicates with the flow path 51. Note that in FIG. 9, the sealing portion 50 that seals the opening 52 is not illustrated. The protrusion portion 80 is formed below the opening 52, as described above. In the liquid ejecting apparatus 1, the temperature sensor 20 can be installed with respect to such a flow path 51 to detect the temperature of the ink flowing in the flow path 51.

In FIG. 9, the flow paths 35*b* and 36*b* are provided for each type of ink. Only one temperature sensor 20 may be provided in the flow path structure 13 or a plurality of temperature sensors 20 may be provided in the flow path structure 13 according to the type of ink.

Figure 10:
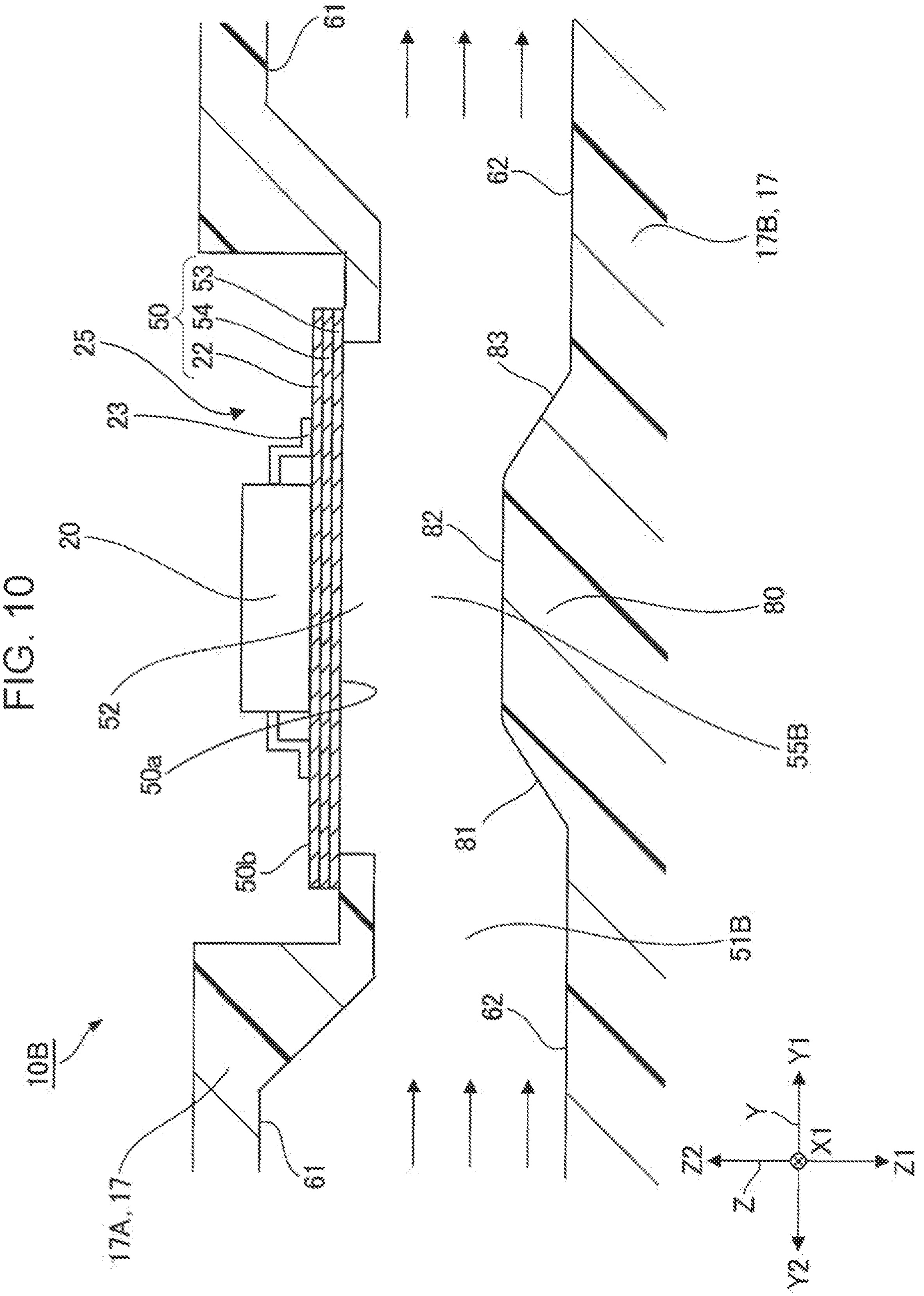
FIG. 10 is a sectional view illustrating a temperature sensor and a narrowed region of a liquid ejecting head according to a second embodiment.

Next, a disposition of a temperature sensor 20 of a liquid ejecting head 10B according to a second embodiment will be described with reference to FIG. 10. FIG. 10 is a sectional view illustrating the temperature sensor 20 and a narrowed region 55B of the liquid ejecting head 10B according to the second embodiment. In the liquid ejecting head 10B, an installation surface of the temperature sensor 20 is disposed below an inner surface 61 that defines a flow path 51B, in the Z-axis direction.

A recess portion 25 recessed toward the inside of the flow path 51B in the Z1 direction is formed on an outer wall surface of a flow path substrate 17A of the liquid ejecting head 10B. The recess portion 25 is recessed in the flow path 51B in the Z1 direction. An opening 52 communicating with the flow path 51B is formed at a bottom portion of the recess portion 25. The opening 52 is covered with a sealing portion 50.

An inner surface 50*a* and an outer surface 50*b* of the sealing portion 50 are disposed in the Z1 direction with respect to the inner surface 61 in the Z-axis direction. The outer surface 50*b*, which is an installation surface on which the temperature sensor 20 is disposed, is disposed at a position close to the top surface 82 of the protrusion portion 80 in the Z-axis direction.

The liquid ejecting head 10B according to the second embodiment as described above also has an action effect similar to that of the liquid ejecting head 10 according to the first embodiment. In the liquid ejecting head 10B, the recess portion 25 is formed and the temperature sensor 20 is disposed at a position close to the protrusion portion 80, and thus, the temperature sensor 20 is disposed at a position close to the center of a flow of an ink in a cross section of the flow path 51B. For that reason, the detection accuracy of the temperature of the ink by the temperature sensor 20 can be improved. Note that in the present embodiment, the protrusion portion 80 protruding from the inner surface 62 may not be provided.

Figure 11:
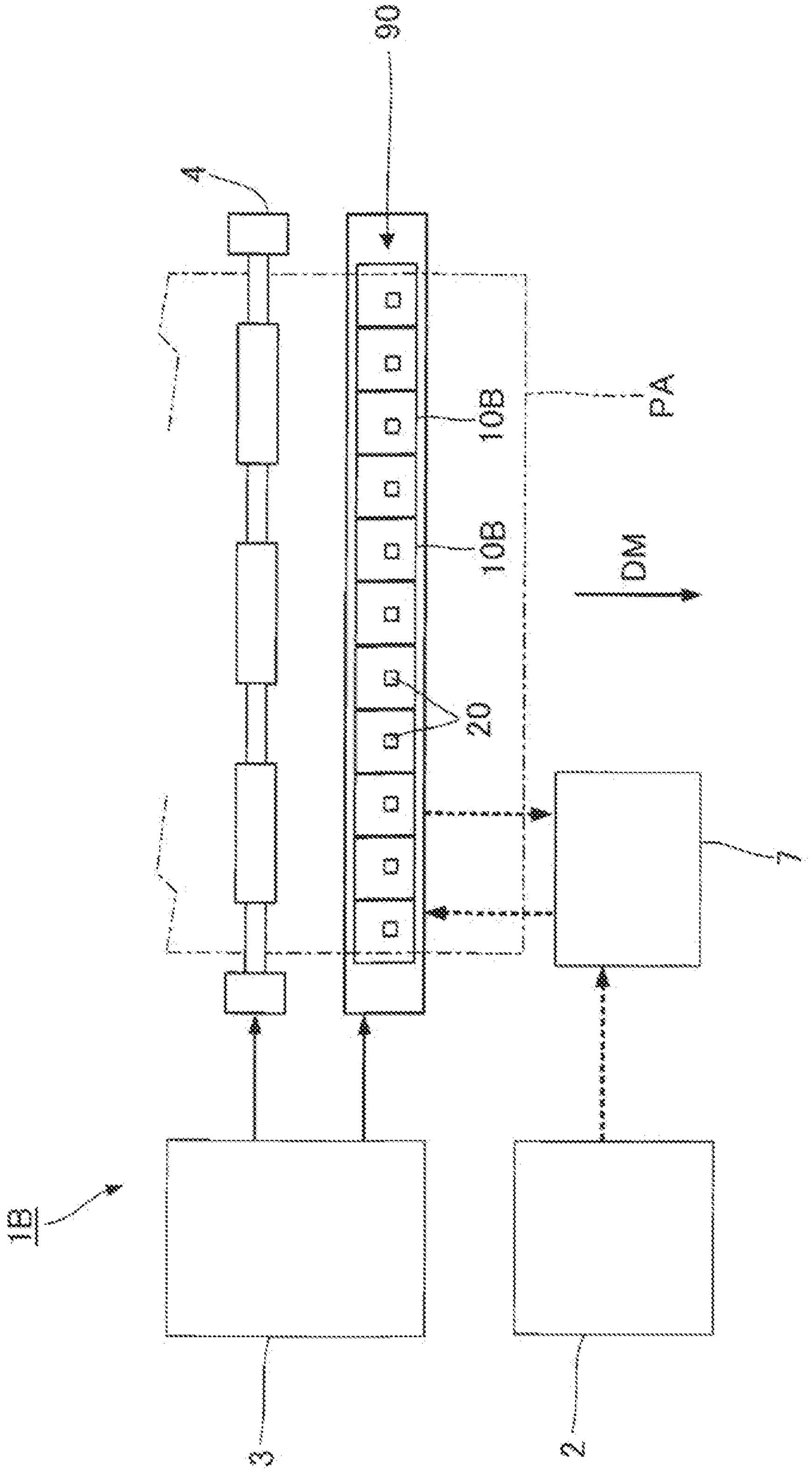
FIG. 11 is a schematic view illustrating a configuration of a liquid ejecting apparatus according to a third embodiment.

Next, a liquid ejecting apparatus 1B according to a third embodiment will be described with reference to FIG. 11. FIG. 11 is a schematic view illustrating a configuration of the liquid ejecting apparatus 1B according to the third embodiment. The liquid ejecting apparatus 1B is a line head type printing apparatus. The liquid ejecting apparatus 1B includes a plurality of liquid ejecting heads 10B. The plurality of liquid ejecting heads 10B are arranged in a predetermined direction to constitute a line head 90. The plurality of liquid ejecting heads 10B are arranged in, for example, a width direction of the medium PA.

An ink stored in a liquid container 2 is supplied to the liquid ejecting head 10B via a circulation mechanism 7. The circulation mechanism 7 supplies the ink to the liquid ejecting head 10B and collects the ink discharged from the liquid ejecting head 10B. The circulation mechanism 7 supplies the collected ink to the liquid ejecting head 10B again. The circulation mechanism 7 includes a flow path for supplying the ink to the liquid ejecting head 10B, a flow path for collecting the ink discharged from the liquid ejecting head 10, a sub-tank for storing the collected ink, a pump for transferring the ink, and the like.

The liquid ejecting head 10B includes a flow path structure in which a flow path through which the ink flows is formed, similar to the liquid ejecting head 10 according to the first embodiment described above. The flow path structure includes a plurality of flow path substrates, and the flow paths are formed by grooves, holes, surfaces, and the like, formed in the flow path substrates. The liquid ejecting head 10B includes a temperature sensor 20 that detects a temperature of the ink in the flow path. A protrusion portion protruding into the flow path is formed on the flow path substrate. The temperature sensor 20 is disposed at a position facing the protrusion portion with the flow path interposed therebetween.

The liquid ejecting apparatus 1B according to the third embodiment as described above also has an action effect similar to that of the liquid ejecting apparatus 1 described above. A configuration of the liquid ejecting head 10B may be the same as that of the liquid ejecting head 10 or may be different from that of the liquid ejecting head 10.

Next, a liquid ejecting head 10 according to a first modification will be described. The liquid ejecting head 10 according to the first modification is different from the liquid ejecting heads 10 according to the above-described embodiments in that the opening 52 is provided upstream of the filter 33 and the temperature sensor 20 is installed at a position corresponding to the opening 52. The opening 52 is covered with the sealing portion 50 as in the above-described embodiments, and the temperature sensor 20 is installed on the outer surface 50*b* of the sealing portion 50.

The liquid ejecting head 10 according to the first modification as described above also has an action effect similar to that of the liquid ejecting head 10 described above. In the liquid ejecting head 10 according to the first modification, since the temperature sensor 20 is installed with respect to the flow path downstream of the filter 33, the temperature sensor 20 can detect the temperature of the ink at a position closer to the nozzle N. In other words, the temperature sensor 20 can detect the temperature of the ink at a position close to the piezoelectric actuator 38. In addition, a configuration in which it is difficult for the air bubbles to stay in the opening 52 provided in a direction opposite to the direction of gravity with respect to the flow path 51 is realized by the protrusion portion 80. As a result, influence of the air bubbles staying and growing in the opening 52 downstream of the filter 33 on discharge from the nozzle N can be suppressed and the piezoelectric actuator 38 can be controlled according to the temperature of the ink at a position close to the piezoelectric actuator 38, such that high-precision printing can be realized.

Next, a liquid ejecting head 10 according to a second modification will be described. The liquid ejecting head 10 according to the second modification is different from the liquid ejecting heads 10 according to the above-described embodiments in that the temperature sensor 20 is provided at an inlet port of the flow path structure 13. The inlet port is, for example, the ink supply port 18. The inlet port of the flow path structure 13 is, for example, a tubular body, and a tube is coupled to this inlet port. An ink flowing in the tube passes through the inlet port and flows into the flow path inside the flow path structure 13.

In the second modification, the temperature sensor 20 is installed on an outer surface of the tubular body constituting the inlet port. Also in the liquid ejecting head 10 according to the second modification as described above, a protrusion portion that protrudes into the flow path toward the temperature sensor 20 is provided. The liquid ejecting head 10 according to the second modification as described above also has an action effect similar to that of the liquid ejecting apparatus 1 described above.

Note that the above-described embodiments merely show typical embodiments of the present disclosure, the present disclosure is not limited to the above-described embodiments, and various modifications and additions can be made without departing from the gist of the present disclosure.

In the above-described embodiment, the narrowed region 55 in which a width of the flow path is small in the Z-axis direction has been described by way of example, but a direction in which the width of the flow path is small is not limited to the Z-axis direction, and the narrowed region 55 may be a narrowed region having a narrow width in another direction intersecting the flow direction of the ink. The flow direction of the ink in the vicinity of the temperature sensor 20 is not limited to the Y-axis direction, and may be the Z-axis direction or the X-axis direction. For example, when the flow direction of the ink is the Z-axis direction, the protrusion portion may be provided in the X1 direction of the flow path, and the temperature sensor 20 may be disposed in the X2 direction of the flow path.

In the above-described embodiment, a case where the temperature sensor 20 is disposed in the Z2 direction with respect to the flow path 51 has been described by way of example, but a direction in which the temperature sensor 20 is disposed is not limited to the Z2 direction, and may be the Z1 direction, the X1 direction, the X2 direction, or any other direction. Similarly, a direction in which the protrusion portion 80 protrudes is not limited to the Z2 direction, and the protrusion portion 80 may protrude in any other direction. The protrusion portion 80 is only required to be able to bring the flow of the ink to a position close to the temperature sensor 20.

In addition, in the above-described embodiment, the opening 52 has been covered from the outside of the flow path using the sealing plate 53, but the sealing plate may be disposed so as to cover the opening 52 from the inside of the flow path. In addition, the opening communicating with the flow path may not be formed. For example, a thickness of a portion of the flow path substrate 17 in contact with the flow path may be reduced, and the temperature sensor 20 may be installed in this portion.

In addition, in the above embodiment, as illustrated in FIGS. 6 and 7, the flow path 51 has been formed by the flow path substrates 17A and 17B, but the flow path 51 may be formed by one flow path substrate 17 or may be formed by three or more flow path substrates 17. For example, a third flow path substrate 17 may be disposed between the flow path substrate 17A and the flow path substrate 17B. The flow path 51 may be formed by the inner surface 61 of the flow path substrate 17A, an opening formed in the third flow path substrate 17 and passing through the third flow path substrate 17 in a plate thickness direction, and the inner surface 62 of the flow path substrate 17B. In addition, the flow path 51 may be configured by an inner surface 61 of the flow path substrate 17A and a groove of the flow path substrate 17B.

In addition, the temperature sensor 20 may be installed on an outer surface of a pipe through which the ink flows or a sealing portion may be provided at a portion coupling the pipes to each other and the temperature sensor 20 may be installed on an outer surface of the sealing portion.

The liquid ejecting apparatus described by way of example in the above-described embodiments can be adopted in various apparatuses such as a facsimile apparatus or a copying machine, in addition to an apparatus dedicated to printing. However, a use of the liquid ejecting apparatus is not limited to the printing. For example, a liquid ejecting apparatus that discharges a solution of a coloring material is used as a manufacturing apparatus that forms a color filter of a display apparatus such as a liquid crystal display panel. In addition, a liquid ejecting apparatus that discharges a solution of a conductive material is used as a manufacturing apparatus that forms a wiring line or an electrode of a wiring board. In addition, a liquid ejecting apparatus that discharges a solution of an organic matter relating to a living body is used as a manufacturing apparatus that manufactures, for example, a biochip.

What is claimed is:

1. A liquid ejecting head comprising:

a plurality of nozzles configured to eject a liquid;

a flow path member in which a flow path that is configured to communicate the liquid to the plurality of nozzles is formed, and which has an inner wall surface defining the flow path and an outer wall surface that faces away from the flow path with respect to the inner wall surface; and a temperature sensor disposed on a part of the outer wall surface and configured to detect a temperature of the liquid in the flow path, wherein the flow path includes a narrowed region having a narrow width in a second direction orthogonal to a first direction in a direction in which the flow path extends, and the temperature sensor is disposed on a portion of the outer wall surface that forms the narrowed region.

2. The liquid ejecting head according to claim 1, wherein the flow path member includes a protrusion portion defining a part of the inner wall surface that faces a part of the inner surface that faces away from the temperature sensor and protruding toward the temperature sensor.

3. The liquid ejecting head according to claim 2, wherein the flow path member includes a first flow path substrate which defines a part of the inner wall surface and in which an opening communicating with the flow path is formed, a second flow path substrate which defines a part of the inner wall surface and in which the protrusion portion is formed in a portion facing the opening, and a sealing portion thinner than a plate thickness of the first flow path substrate and covering the opening from an outside of the flow path, and the temperature sensor is disposed on a surface of the sealing portion that is faces away from the flow path.

4. The liquid ejecting head according to claim 3, wherein the opening is long in the first direction.

5. The liquid ejecting head according to claim 3, wherein a length of the opening in the first direction is greater than a length of the protrusion portion in the first direction.

6. The liquid ejecting head according to claim 3, wherein the second direction is along a direction of gravity, and the opening is disposed on a direction opposite to the direction of gravity with respect to the flow path.

7. The liquid ejecting head according to claim 6, wherein the flow path is provided with a filter through which the liquid passes, and the opening is disposed downstream of the filter.

8. The liquid ejecting head according to claim 2, wherein the protrusion portion includes a top surface disposed at a position closest to the temperature sensor in the second direction, and in a cross section orthogonal to the first direction, a cross-sectional area of the flow path close to the temperature sensor from the top surface is greater than a cross-sectional area of the flow path far from the temperature sensor from the top surface.

9. A liquid ejecting apparatus comprising:

the liquid ejecting head according to claim 1; and a liquid storage portion storing the liquid supplied to the liquid ejecting head.

10. The liquid ejecting head according to claim 1, wherein the temperature sensor is liquidly isolated from the liquid in the flow path, the flow path member includes a protrusion portion protruding in the second direction and defining a part of the inner wall surface that faces a part of the inner surface that faces away from the temperature sensor and protruding toward the temperature sensor, and the protrusion portion, the narrowed region of the flow path, the inner wall surface, the outer wall surface, and the temperature sensor are arranged in the second direction in this order, when viewed in a third direction orthogonal to the first direction and the second direction.

11. A liquid ejecting head comprising a nozzle configured to eject a liquid;

a flow path member in which a flow path that is configured to communicate the liquid to the nozzle is formed, and which has an inner wall surface defining the flow path and an outer wall surface that faces away from the flow path with respect to the inner wall surface; and a temperature sensor disposed on a part of the outer wall surface and configured to detect a temperature of the liquid in the flow path, wherein the flow path includes a narrowed region having a narrow width in a second direction orthogonal to a first direction in a direction in which the flow path extends, the temperature sensor is disposed on a portion of the outer wall surface that forms the narrowed region, the flow path member includes a protrusion portion defining a part of the inner wall surface that faces a part of the inner surface that faces away from the temperature sensor and protruding toward the temperature sensor, the protrusion portion includes a first slope disposed upstream of the temperature sensor in the first direction, and a second position of the first slope positioned downstream of a first position of the first slope is closer to the temperature sensor than is the first position with respect to the second direction.

12. The liquid ejecting head according to claim 11, wherein a virtual plane extending along the first slope overlaps the temperature sensor, when viewed in a third direction orthogonal to the first direction and the second direction.

13. The liquid ejecting head according to claim 11, wherein an inclination angle of the first slope with respect to a reference plane along a third direction orthogonal to the first direction and the second direction is 50° or less.

14. The liquid ejecting head according to claim 11, wherein the flow path member includes a second slope disposed upstream of the temperature sensor in the first direction and spaced apart from the first slope in a normal direction of the first slope, and a second position of the second slope positioned downstream of a first position of the second slope is closer to the temperature sensor than is the first position of the second slope with respect to the second direction.

15. A liquid ejecting apparatus comprising:

the liquid ejecting head according to claim 3; and a liquid storage portion storing the liquid supplied to the liquid ejecting head.

16. A liquid ejecting head comprising:

a nozzle configured to eject a liquid;

a flow path member in which a flow path that is configured to communicate the liquid to the nozzle is formed, and which has an inner wall surface defining the flow path and an outer wall surface that faces away from the flow path with respect to the inner wall surface; and a temperature sensor disposed on a part of the outer wall surface and configured to detect a temperature of the liquid in the flow path, wherein the flow path includes a narrowed region having a narrow width in a second direction orthogonal to a first direction in a direction in which the flow path extends, the temperature sensor is disposed on a portion of the outer wall surface that forms the narrowed region, the flow path member includes a protrusion portion defining a part of the inner wall surface that faces a part of the inner surface that faces away from the temperature sensor and protruding toward the temperature sensor, the outer wall surface of the flow path member has a recess portion recessed toward an inside of the flow path in the second direction, and the temperature sensor is disposed in the recess portion.

17. A liquid ejecting apparatus comprising:

the liquid ejecting head according to claim 13; and a liquid storage portion storing the liquid supplied to the liquid ejecting head.

* * * * *